July 4, 1944.  J. K. JACKSON  2,353,038

CLARIFICATION AND COOLING OF FLUIDS

Original Filed Jan. 11, 1940

Inventor
JOHN K. JACKSON

Patented July 4, 1944

2,353,038

UNITED STATES PATENT OFFICE 2,353,038

CLARIFICATION AND COOLING OF FLUIDS

John K. Jackson, Corning, N. Y., assignor to Corning Glass Works, Corning, N. Y., a corporation of New York Original application January 11, 1940, Serial No. 313,457. Divided and this application December 5, 1940, Serial No. 368,713

4 Claims. (Cl. 210—52.5)

The present invention relates to the clarification or purification and cooling of fluids and is a division of my co-pending application Serial No. 313,457, filed January 11, 1940, to a Glass tempering apparatus wherein articles are heated in a fluid bath and chilled in a second fluid bath. In the tempering of ware in the manner described in the copending application it is necessary to maintain the tempering fluid at a predetermined temperature below that of ware immersed therein and also to maintain the fluid reasonably free from foreign matter such, for example, as heating bath constituents likely to be carried into the fluid by the ware immersed therein.

The object of the present invention is the maintenance of the temperature and composition of an article chilling fluid at a predetermined constant value in spite of the periodic introduction of heat and of impurities during use.

Figure 1:
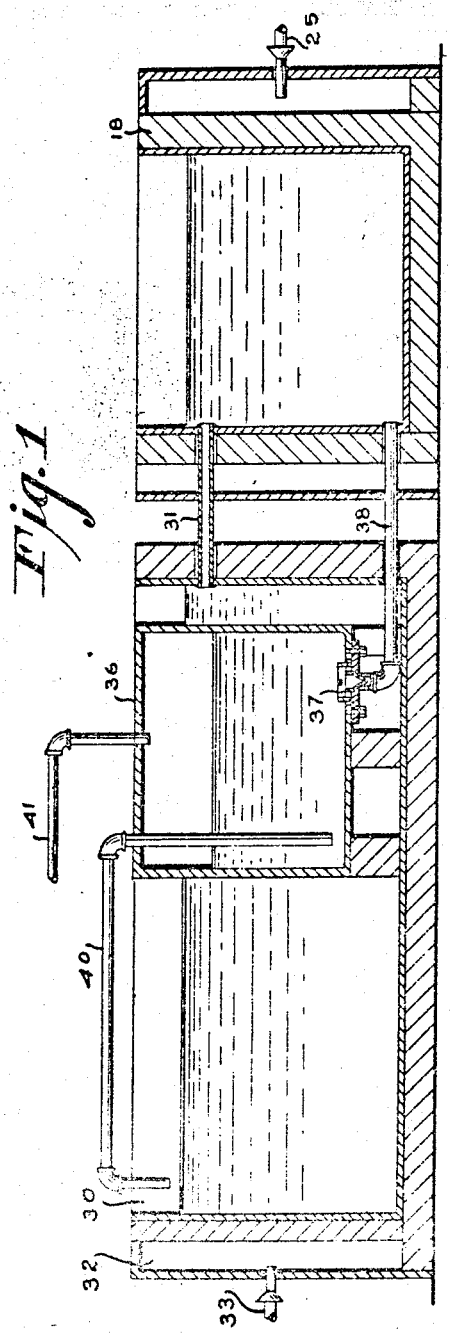
Figure 2:
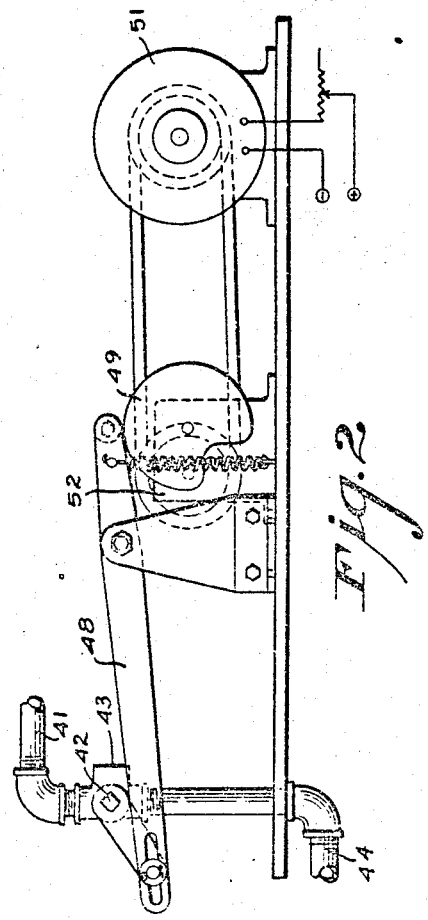

One form of structure embodying features of the invention is illustrated in the accompanying drawing wherein Fig. 1 is a sectional elevation of a ware chilling tank arranged in operative relation with a fluid cooling and settling tank; and Fig. 2 is a side-elevation of an apparatus for circulating fluid between the chilling and settling tanks.

As shown in Fig. 1, a chilling fluid tank 18 is connected with a settling and cooling tank 30 by a pipe 31. This tank is at least in part provided with an enclosure 32 into which burners such as 33 are projected to heat the material in the tank 30 to a desired temperature prior to the commencement of tempering operations. After such operations have started the rate of circulation of fluid between tank 30 and tank 18 is so regulated that the temperature of the fluid in tank 30 drops sufficiently below that of the fluid in the chilling tank to permit precipitation of heating bath constituents therein into a sludge in the tank 30 from which it can be removed from time to time. The temperature and volume of fluid circulated between tanks 18 and 30 is also such that the fluid in tank 30 is sufficiently cooled that limited use of burners 25 surrounding tank 18 are required to maintain the tempering bath at the temperature desired.

Owing to the temperature of the chilling fluid and its corrosive characteristics, conventional forms of pumping equipment are unsatisfactory; accordingly, the herein disclosed equipment has been provided to effect the desired circulation of fluid. This equipment includes a covered tank 36, within tank 30, provided with a bottom opening containing a check valve 37 and a pipe connection 38 with the chilling fluid tank 18. A second pipe 40 extends from within tank 36 into communication with the settling tank 30, while a third pipe 41 extends from the top of tank 36 to a two-way valve 42 having a side opening 43 to atmosphere and its remaining line opening connected with an air supply line 44. As will be evident, fluid from the chilling tank 18 flows freely into tank 36 past check valve 37 when valve 42 is in a position connecting pipe 41 to atmosphere. During this time, owing to the lowering of the level of fluid in tank 18, fluid will flow through pipe 31 from tank 30 to tank 18 tending to equalize the liquid levels in these tanks. When valve 42 is in a position in which air from line 44 is supplied to tank 36 the pressure therein will hold valve 37 closed and force the accumulated liquid in tank 36 through pipe 40 into tank 30, thereby also causing a flow of liquid from tank 30 to tank 18, tending to equalize the fluid levels in these tanks.

The valve 42 is operated by a lever 48 under the influence of a cam 49. This cam is rotated by a variable speed motor 51 through a gear reduction unit 52 and during a major portion of each revolution holds the valve 42 in a position connecting tank 36 to atmosphere, during which time fluid flows from tank 18 and accumulates in tank 36. As each revolution is completed the side opening of the valve 42 is closed to atmosphere and air from line 44 supplied to tank 36, thereby stopping the flow of liquid into this tank and forcing the liquid accumulated therein into tank 30. By modifying the speed of motor 51 the rate of fluid circulation between the respective tanks can be adjusted to meet best operating requirements.

I claim:

1. In a liquid clarifying apparatus, a first container for liquid to be clarified having an outlet conduit near its top, a second container the top of which extends above the outlet conduit of said first container and being in communication with said conduit, a closed liquid chamber extending to substantially the height of said first container, a conduit extending between lower regions of the first container and chamber and having an associated check valve preventing flow of liquid from the chamber to the first container, a conduit extending from within the upper portion of said second container to within and near the bottom of said chamber, and means for alternately placing said closed liquid chamber in communication with atmospheric and super-atmospheric pressure sources.

2. The method of circulating a liquid between a first container and a second container which includes flowing liquid for a predetermined time period from the first container to a closed container while venting the closed container to atmosphere, and transferring the liquid accumulated in said closed container to the second container to effect the overflow of a like quantity of liquid from the second container to the first by discontinuing the venting of the closed container and instead creating a super-atmospheric pressure therein while preventing liquid therein from being forced directly back into the first container.

3. The method of circulating a liquid between a first and second container, which includes flowing a predetermined quantity of liquid by gravity from the first container to a confined space, preventing back flow of liquid from the confined space to the first container while creating a super-atmospheric pressure in the confined space to force the liquid accumulated therein into the second container to effect an overflow of liquid from the second container to the first.

4. The method of clarifying and cooling liquid which includes periodically flowing a quantity of liquid by gravity from a pool into a container, pneumatically forcing liquid accumulated in the container into a liquid cooling and settling tank already filled with liquid to effect an overflow of liquid from the tank into the pool, in the meantime preventing a back flow of liquid from the container to the pool and from time to time removing solids from the tank which have settled out of the liquid therein.

JOHN K. JACKSON.